Nov. 7, 1933.        S. NEGISHI        1,933,750
METHOD OF MANUFACTURING LEAD SULPHATES CONTAINING LEAD OXIDE
Filed Aug. 15, 1930

Inventor
Shin Negishi
by
Attorney

Patented Nov. 7, 1933

1,933,750

UNITED STATES PATENT OFFICE 1,933,750

METHOD OF MANUFACTURING LEAD SULPHATES CONTAINING LEAD OXIDE

Shin Negishi, Amagasaki, Hyogo Ken, Japan, assignor to Empun Toryo Kabushiki Kaisha, Kamikyo-Ku, Kyoto, Japan, a corporation of Japan Application August 15, 1930, Serial No. 475,618, and in Japan September 21, 1929

1 Claim. (Cl. 23—127)

This invention relates to a method of manufacturing finely pulverized lead sulphates, which method consists in suspending finely powdered lead suboxide, whether pure or containing litharge or red lead in an air floated condition in a current of air and mixing the same with sulphurous acid gas in a calcining furnace and thus causing them to react.

The main object of the invention is to produce a fine and bulky powder of light and fluffy lead sulphates which has a very large reaction surface and great covering power.

The invention is an improvement in the method of manufacturing sulphates of lead, especially basic sulphate, which consists in employing as the starting material, a charge of lead suboxide, litharge, red lead or their mixture or a substance containing them in finely pulverized form, then blowing the same together with a current of air into a high temperature furnace chamber, also introducing sulphurous acid gas therein, and keeping the lead suboxide, etc., suspended in the form of solid fine particles in the air current and sulphurous acid gas so as to cause them to react and enable the combined and mixed proportions of lead sulphate and lead suboxide to be regulated at will, thus producing a highly useful fine powder of light and amorphous lead sulphates which has a large reaction surface and great covering power and also the necessary pure whiteness.

Figure 1:
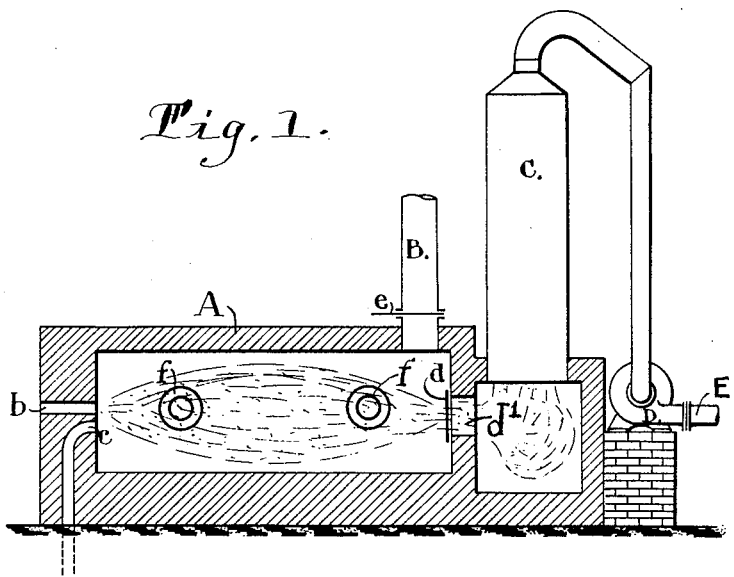
Figure 2:
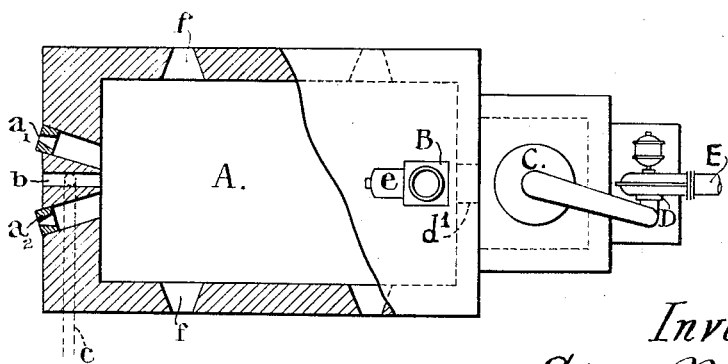

Referring to the accompanying drawing,

Figure 1 is a sectional view of the apparatus which may be used in the practice of this invention; and Figure 2 is a plan of the same partly in section.

The following is an example of the method for carrying this invention into practice:—

A is a heating or calcining furnace for causing the desired reaction, and $a_1$ and $a_2$ are oil or gas burners for producing and maintaining the temperature in the furnace at about 700° C. When the furnace is heated before the operation is started, the gases of combustion are permitted to escape by opening a damper $e$ in the chimney B. When the operation has been started, the damper $e$ is closed, while a damper $d$ is opened. At $f$ and $f$ outlets are provided for a portion of the product of the furnace, while at $b$ is a conduit through which to introduce or to blow in finely powdered lead suboxide by means of an air current which carries the same and said conduit is so located as to be normally enveloped during operation by flames from $a_1$ and $a_2$. At $c$ is an outlet for sulphurous acid gas, which is introduced into the furnace from the lower part of the conduit $b$. The suspended powdered material enters the flame zone and is kept in suspension in an air floated condition in the current of air and sulphurous acid gas so that they are caused to react upon one another so as to produce basic sulphate and are then discharged out of the furnace through a passage $d^1$. The product, floating in the air current, is carried through a cooling tower C and through a conduit E by means of a fan D, whereafter, it may be collected by filtering the same through a filtering bag, or else by precipitating said product in a precipitating chamber. Thus, it is possible to produce light and fluffy sulphates of lead which have a pure white color and an apparent specific gravity of 0.4 as well as a great reaction surface and covering power, adapting the product for various uses in the arts.

According to the present invention, it is not only possible to easily regulate the proportion of the lead sulphate and lead oxide by regulating the amount and temperature of sulphurous acid gas to be supplied, but also, if desired, to cause the product to contain lead oxide in an uncombined state, or on the other hand, to convert the whole starting material into lead sulphate.

Having now fully described my invention, I claim:—

Method of manufacturing white lead sulphates in the form of fine powder, which consists in blowing a powder of lead suboxide in the form of suspended solid particles by means of a current of air into a high temperature chamber provided with a supply of sulphurous acid gas and maintaining the suspension of said solid particles within said chamber in the air thus introduced and the sulphurous acid gas in order to cause said lead suboxide powder to react therewith.

SHIN NEGISHI.